(12) United States Patent
Lee et al.

(10) Patent No.: US 8,350,185 B2
(45) Date of Patent: Jan. 8, 2013

(54) LASER WELDING METHOD FOR STEEL SHEET

(75) Inventors: Mun-Yong Lee, Pusan (KR);
Byung-Hun Jung, Pusan (KR);
Mun-Jong Song, Pusan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 338 days.

(21) Appl. No.: 12/825,424

(22) Filed: Jun. 29, 2010

(65) Prior Publication Data

US 2011/0139753 A1    Jun. 16, 2011

(30) Foreign Application Priority Data

Dec. 15, 2009  (KR) .................. 10-2009-0124785

(51) Int. Cl.
*B23K 26/00* (2006.01)
(52) U.S. Cl. .............................. 219/121.64; 219/121.63
(58) Field of Classification Search ............. 219/121.63, 219/121.64
See application file for complete search history.

(56) References Cited

U.S. PATENT DOCUMENTS

| | | | | |
|---|---|---|---|---|
| 5,603,853 A | * | 2/1997 | Mombo-Caristan | 219/121.64 |
| 5,841,097 A | * | 11/1998 | Esaka et al. | 219/121.63 |
| 7,763,827 B2 | * | 7/2010 | Papenfuss et al. | 219/121.64 |
| 2008/0245776 A1 | * | 10/2008 | Oda et al. | 219/121.63 |

FOREIGN PATENT DOCUMENTS

| | | |
|---|---|---|
| DE | 102004043076 | 4/2005 |
| DE | 102007063456 | 11/2006 |
| JP | 09-206969 | 8/1997 |
| JP | 10-314933 | 12/1998 |
| JP | 2006-088175 | 4/2006 |
| JP | 2006-281279 | 10/2006 |

\* cited by examiner

*Primary Examiner* — Tan N Tran
(74) *Attorney, Agent, or Firm* — Lexyoume IP Meister, PLLC.

(57) ABSTRACT

The present invention provides a laser welding method for steel sheets. The laser welding method includes irradiating a low heat input laser beam to a weld zone with a uniform welding pattern of a zigzag shape, with a constant pitch, and with a constant welding speed, so that autogenous welding may be achieved without a feed wire, such that cost of material may be reduced and joinability and performance may be improved.

6 Claims, 4 Drawing Sheets

LASER WELDING METHOD FOR STEEL SHEET

CROSS-REFERENCE TO RELATED APPLICATION

This application claims priority to and the benefit of Korean Patent Application No. 10-2009-0124785 filed in the Korean Intellectual Property Office on Dec. 15, 2009, the entire contents of which are incorporated herein by reference.

BACKGROUND OF THE INVENTION (a) Field of the Invention

The present invention relates to a laser welding method for metal sheets. More particularly, the present invention relates to laser welding method for metal sheets wherein a low heat input laser beam is irradiated to a weld zone with a uniform welding pattern of a zigzag shape, with a constant pitch, and with a constant welding speed, thereby enhancing joinability of the weld zone.

(b) Description of the Related Art

Generally, in an assembling process of a vehicle, spot welding is widely used, and arc welding and laser welding are used when the spot welding is not appropriate.

Gas metal arc welding (GMAW), representing arc welding, is a semi-automatic or automatic arc welding process in which a continuous and consumable wire electrode as a filler metal and a shielding gas are fed through a welding gun to a base metal for forming an arc between the wire and the base metal.

In the gas metal arc welding method, the continuously fed wire is melted by the arc and forms a metal vapor or globule and the base metal is melted to be a molten weld pool. The fusion zone is separated from the atmosphere by the shield gas supplied from a gas nozzle, and gas metal arc welding, according to the kind of shield gas, is classified as metal inert gas (MIG) welding using an inert gas such as Ar and $CO_2$, arc welding using $CO_2$, and metal active gas (MAG) welding using a mixture of Ar and $CO_2$.

The gas metal arc welding generally uses a relatively small diameter electrode wire (0.9-1.6 mm diameter) so that it has a relatively higher deposition rate and is more efficient than shielded metal arc welding (SMAW), consumes relatively less welding materials, and may achieve welding efficiency of more than 95%. Also, automation using a welding robot and so on may be easily achieved and welding productivity may be enhanced.

The gas metal arc welding equipment is relatively more complex than that of the shielded metal arc welding (SMAW) so a breakdown or failure may frequently occur, and it is relatively much more expensive. Gas metal arc welding also generates a large amount of spatter that adheres to the base metal so as to deteriorate appearance. Also, when the spatter adheres to the nozzle, it may disturb the supply of shield gas so as to deteriorate welding quality. Further, the gas metal arc welding process may not be used when it is difficult to approach the weld zone with the welding gun.

Laser welding has a relatively high welding speed, a short welding cycle, small heat input, a small heat affected zone (HAZ), little deformation, and so on, so the laser welding has been increasingly widely used in industry while replacing spot welding and arc welding. In laser welding, keyhole welding using energy reflection and absorption in a focal region of a laser beam has been widely used, and the distance of the keyhole welding region from a focus is within 2 mm.

That is, according to keyhole welding that is performed at the keyhole welding region, electromagnetic waves of the laser beam collide with the material surface at a focal point where the laser beam is converged, collision energy is transformed into heat energy, and a keyhole effect occurs. Such keyhole effect means a state where welding is performed when a plurality of small holes are made in a melted pool by vapor pressure.

However, conventional laser welding, particularly keyhole welding, uses high power so as to penetrate a weld zone and forming a crater along a welding line so that good weld quality, such as with arc welding, may not be obtained.

Thus, laser welding is under investigation for obtaining good weld quality, such as with arc welding, which may achieve autogenous welding without feeding wire.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a laser welding method for steel sheets having advantages that a low heat input laser beam is irradiated to a weld zone with a uniform welding pattern of a zigzag shape, with a constant pitch and a constant welding speed, so that autogenous welding may be achieved without feeding wire, cost of material may be reduced, and joinability and performance may be more improved when metal sheets are lap-welded by using a laser beam, A laser welding method for steel sheets according to an exemplary embodiment of the present invention may include irradiating a low heat input laser beam to a weld zone along an end of a metal sheet overlapped with another metal sheet with a uniform welding pattern of a zigzag shape, with a constant pitch and a constant welding speed, wherein adjacent laser beam fusion zones are partially overlapped.

The laser beam may be oscillated by an Nd:YAG laser oscillator.

Output of the laser beam may be 3.2 kW to 3.8 kW.

The welding pattern of a zigzag shape may be formed by a repeated "V" shape, and may have a pitch that is equal or less than 1 mm and a width between 4 mm and 6 mm.

The welding speed may be 150 mm/sec to 250 mm/sec.

The width of the laser beam fusion zone may be larger than the pitch of the welding pattern.

The metal sheets may have a gap therebetween that may be less than 1 mm.

As described above, the laser welding method according to the exemplary embodiment of the present invention may be a lap-welding method performed by welding along an end of one metal sheet overlapped with another metal sheet so as to form a weld zone, and a low heat input laser beam of 3.2 kW to 3.8 kW is irradiated to the weld zone with a 150 mm/sec to 250 mm/sec welding speed. The laser welding method is applied in a zigzag shape forming a repeated "V" shape welding pattern where the pitch is equal to or less than 1 mm and the width is between 4 mm and 6 mm. Thus, according to the exemplary embodiment of the present invention, the laser welding method for the metal sheet produces welding quality that is as good as or superior to gas metal arc welding (GMAW), for example active gas metal arc welding, metal active gas (MAG), or CO2 welding, and joinability and performance of the weld zone may be better than conventional keyhole welding or gas metal arc welding.

Further, the laser welding method according to the exemplary embodiment of the present invention does not need a shield gas such as $CO_2$ used in the gas metal arc welding, so it may be called an environment-friendly welding method, and autogenous welding may be achieved so that feeding wires is not required and the cost of material may be reduced.

DETAILED DESCRIPTION OF THE EMBODIMENTS

Hereinafter, an exemplary embodiment of the present invention will be described in detail with reference to the accompanying drawings.

Figure 1:
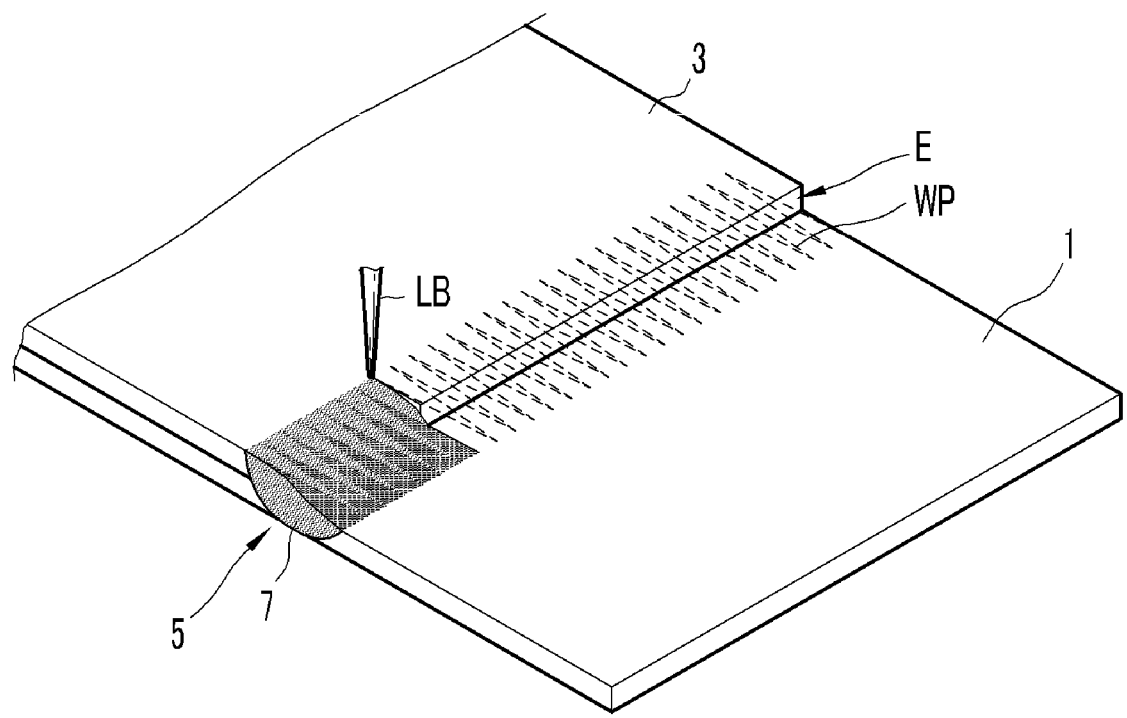
FIG. 1 is a perspective view showing a laser welding method according to an exemplary embodiment of the present invention.
Figure 2:
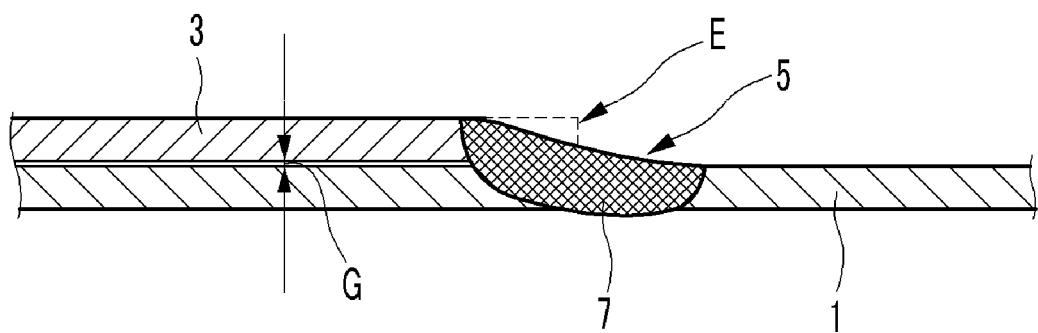
FIG. 2 is a cross-sectional side view of a welded portion according to an exemplary embodiment of the present invention.
Figure 3:
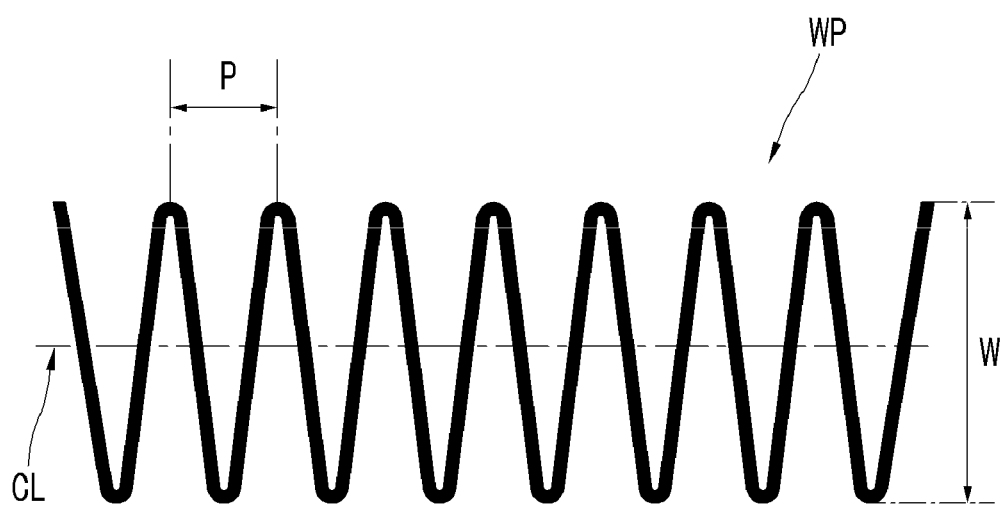
FIG. 3 is drawing showing a welding pattern of a laser welding method according to an exemplary embodiment of the present invention.
Figure 4:
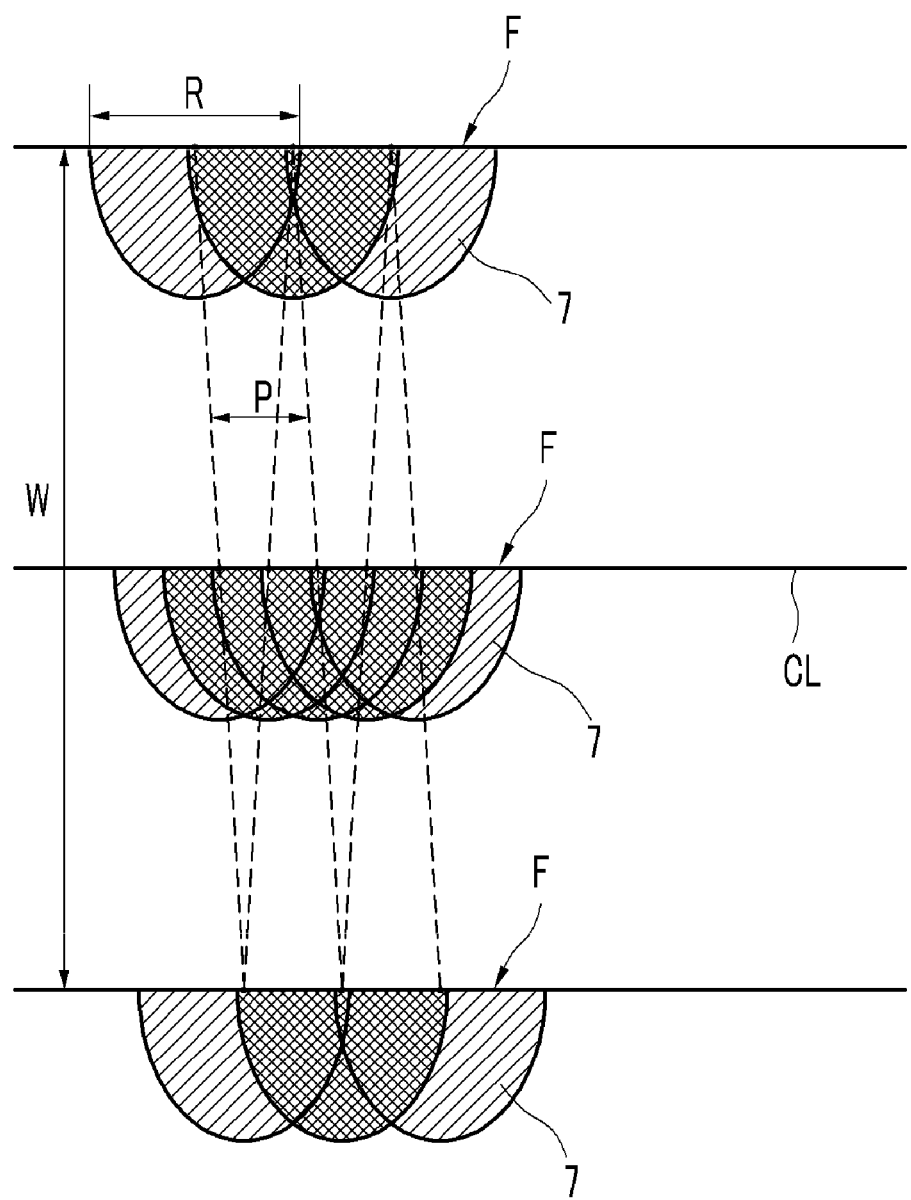
FIG. 4 is a drawing showing partial overlapping of laser beam fusion zones of a laser welding method according to an exemplary embodiment of the present invention.

FIG. 1 is a perspective view showing a laser welding method according to an exemplary embodiment of the present invention, and FIG. 2 is a cross-sectional side view of a welded portion according to an exemplary embodiment of the present invention. FIG. 3 is drawing showing a welding pattern of a laser welding method according to an exemplary embodiment of the present invention, and FIG. 4 is a drawing showing partial overlapping of laser beam fusion zones of a laser welding method according to an exemplary embodiment of the present invention.

A laser welding method according to an exemplary embodiment of the present invention, as shown in FIG. 1, is a lap-welding method of welding along an end E of an upper metal sheet 3 partially overlapped with a lower metal sheet 1 so as to form a weld zone 5, and a low heat input laser beam LB is irradiated to the weld zone 5 with a uniform welding pattern of a zigzag shape, with a constant pitch and a constant welding speed.

That is, the upper metal sheet 3 is overlapped with the lower metal sheet 1, and as shown in FIG. 2, one end E of the upper metal sheet 3 is melted by using a low heat input laser beam LB, and a laser beam fusion zone 7 of the weld zone 5 of the upper metal sheet 3 and the lower metal sheet 1 is repeatedly partially overlapped.

The welding pattern WP with a zigzag shape, as shown in FIG. 3, is formed by repeated "V" shapes. According to experiments, the pitch of the welding pattern WP may be equal or less than 1 mm and the width of the welding pattern WP may be 4 mm to 6 mm.

The laser beam fusion zone 7, as shown in FIG. 4, may have a semi-elliptical form on a surface F of the weld zone 5 with a width axis R, which is larger than the pitch P of the welding pattern WP, and the end E of the upper metal sheet 3 is melted to be a filler metal to the lower metal sheet 1. The width of each laser beam fusion zone 7 is formed to be more than 2 times the pitch of the welding pattern WP for autogenous welding, by partially overlapping adjacent laser beam fusion zones 7.

The laser beam may be oscillated by an Nd:YAG laser oscillator.

In this laser welding method, according to experiments, output of the low heat input laser beam LB may be 3.2 kW to 3.8 kW, and welding speed may be 150 mm/sec to 250 mm/sec.

For achieving the laser welding method according to an exemplary embodiment of the present invention, a gap G between the upper metal sheet 3 and the lower metal sheet 1 may be equal to or less than 1 mm.

Thus, the laser welding method according to the exemplary embodiment of the present invention, as shown in FIG. 1, is a lap-welding method through welding along the end E of the upper metal sheet 3 overlapped with the lower metal sheet 1 so as to form the weld zone 5, and the low heat input laser beam LB of 3.2 kW to 3.8 kW is irradiated to the weld zone 5 at a 150 mm/sec to 250 mm/sec welding speed. And as shown in FIG. 3, the laser welding method is applied to a zigzag pattern forming a repeated "V" shape welding pattern WP with a pitch that is equal to or less than 1 mm and a width between 4 mm and 6 mm.

In the weld zone 5, as shown in FIG. 4, adjacent laser beam fusion zones 7 are partially overlapped at ends of the welding pattern WP, and are overlapped partially more than third times along a center line CL corresponding to the end E of the upper metal sheet 3. Thus, in the laser welding method according to the exemplary embodiment of the present invention, the end E of the upper metal sheet 3 is melted to be filler metal for the lower metal sheet 1 for autogenous welding without feeding wire so that welding quality may be improved.

According to the exemplary embodiment of the present invention, the laser welding method for the metal sheet results in welding quality that is equal to or superior than gas metal arc welding (GMAW), for example active gas metal arc welding, metal active gas (MAG), or CO2 welding, and joinability and performance of the weld zone 5 may be improved compared to conventional keyhole welding or gas metal arc welding.

In addition, the laser welding method does not need a shield gas such as $CO_2$ used in the gas metal arc welding, so it may be called an environment-friendly welding method, and the end of the upper metal sheet is melted to be a filler metal for the lower metal sheet for autogenous welding so that feeding wire is not required and the cost of material may be reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for laser welding, the method comprising:
   providing an underlying metal sheet;
   providing an overlying metal sheet that is positioned over a portion of the underlying metal sheet; and
   irradiating a weld zone with a low heat input laser beam, wherein:
   the weld zone includes a selected edge of the overlying metal sheet and an upper surface region of the underlying metal sheet that is adjacent to the selected edge;
   the laser beam is moved across the weld zone in a zigzag pattern;
   the laser beam is oscillated by an Nd:YAG laser oscillator;

the laser beam has an output power from 3.2 kW to 3.8 kW;

the zigzag pattern has a width between 4 mm and 6 mm;

the zigzag pattern has a pitch that is (a) equal to or less than 1 mm and (b) constant across at least a portion of the weld zone;

the laser beam is moved across the weld zone with a welding speed that is (a) from 150 mm sec$^{-1}$ to 250 mm sec$^{-1}$ and (b) constant across at least a portion of the weld zone;

the laser beam has a fusion zone having a fusion zone width that is larger than the pitch of the zigzag pattern; and adjacent laser beam fusion zones in the zigzag pattern are partially overlapped.

2. The laser welding method of claim 1, wherein, before irradiating the weld zone with the laser beam, the overlying and underlying metal sheets are separated by a gap having a width less than 1 mm.

3. The laser welding method of claim 1, wherein at least a portion of the upper surface region of the underlying metal sheet that falls within the weld zone is separated from edges of the underlying metal sheet.

4. A laser welding method for lap-welding metal sheets, the method comprising:

providing an underlying metal sheet;

providing an overlying metal sheet that is positioned over a portion of the underlying metal sheet; and irradiating a weld zone with a low heat input laser beam, wherein:

the weld zone includes a selected edge of the overlying metal sheet and an upper surface region of the underlying metal sheet that is adjacent to the selected edge;

the laser beam is moved across the weld zone in a zigzag pattern;

the laser beam is oscillated by an Nd:YAG laser oscillator;

the laser beam has an output power from 3.2 kW to 3.8 kW;

the zigzag pattern has a pitch that is equal to or less than 1 mm;

the laser beam is moved across the weld zone with a welding speed that is from 150 mm sec$^{-1}$ to 250 mm sec$^{-1}$;

irradiating the weld zone results in the selected edge of the metal sheet being melted such that it becomes a filler metal for autogenous welding;

the laser beam has a fusion zone having a fusion zone width that is larger than the pitch of the zigzag pattern; and adjacent laser beam fusion zones in the zigzag pattern are partially overlapped.

5. The laser welding method of claim 4, wherein, before irradiating the weld zone with the laser beam, the overlying and underlying metal sheets are separated by a gap having a width less than 1 mm.

6. The laser welding method of claim 4, wherein at least a portion of the upper surface region of the underlying metal sheet that falls within the weld zone is separated from edges of the underlying metal sheet.

* * * * *